United States Patent
Chen et al.

(10) Patent No.: US 8,692,547 B2
(45) Date of Patent: Apr. 8, 2014

(54) FORMATION EVALUATION CAPABILITY FROM NEAR-WELLBORE LOGGING USING RELATIVE PERMEABILITY MODIFIERS

(75) Inventors: Songhua Chen, Katy, TX (US); Tianping Huang, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 379 days.

(21) Appl. No.: 13/231,358

(22) Filed: Sep. 13, 2011

(65) Prior Publication Data
US 2012/0068700 A1 Mar. 22, 2012

Related U.S. Application Data

(60) Provisional application No. 61/383,512, filed on Sep. 16, 2010.

(51) Int. Cl.
G01V 3/00 (2006.01)

(52) U.S. Cl.
USPC .......................................... 324/303; 324/300

(58) Field of Classification Search
USPC .................................................. 324/300–322
See application file for complete search history.

(56) References Cited

U.S. PATENT DOCUMENTS

| | | |
|---|---|---|
| 6,283,210 B1 | 9/2001 | Soliman et al. |
| 6,871,713 B2 | 3/2005 | Meister et al. |
| 7,497,256 B2 * | 3/2009 | DiFoggio et al. ............. 166/264 |
| 7,565,246 B2 | 7/2009 | Fang et al. |
| 7,588,081 B2 | 9/2009 | Pfeiffer et al. |
| 2008/0051302 A1 | 2/2008 | Crews et al. |
| 2009/0095484 A1 | 4/2009 | Huang et al. |
| 2009/0203555 A1 | 8/2009 | Milne et al. |
| 2009/0286702 A1 | 11/2009 | Huang et al. |
| 2011/0042141 A1 * | 2/2011 | Herrick ........................... 175/48 |

OTHER PUBLICATIONS

Grattonia, C. et al., "Polymers as relative permeability modifiers: adsorption and the dynamic formation of thick polyacrylamide layers," Journal of Petroleum Science and Engineering, vol. 45, Issues 3-4, pp. 233-245, Dec. 15, 2004.

Dalrymple E. D. et al., "Effect of relative-permeability modifier treatments in a sandstone-layered system and in a sandstone-homogeneous system," SPE/DOE Symposium on improved oil recovery, SPE 39636, No. 11, Tulsa, OK, pp. 345-357 Apr. 19-22, 1998.

Tielong, Chen, et al, "A Relative Permeability Modifier for Water Control of Gas Wells in a Low-Permeability Reservoir", SPE Reservoir Engineering, vol. 11, No. 3, pp. 168-173, Apr. 28, 1996.

* cited by examiner

*Primary Examiner* — Brij Shrivastav
(74) *Attorney, Agent, or Firm* — Mossman Kumar & Tyler PC

(57) ABSTRACT

Nano-particles that possess either selective fluid phase blocks or modify the relative permeability of an earth formation to different fluids are used to inhibit the invasion of borehole mud into the formation. This makes it possible to make formation evaluation measurements using sensors with a shallow depth of investigation.

17 Claims, 2 Drawing Sheets

FORMATION EVALUATION CAPABILITY FROM NEAR-WELLBORE LOGGING USING RELATIVE PERMEABILITY MODIFIERS

CROSS-REFERENCES TO RELATED APPLICATIONS

This application claims priority from U.S. Provisional Patent Application Ser. No. 61/383,512, filed on 16 Sep. 2010, incorporated herein by reference in its entirety.

FIELD OF THE DISCLOSURE

This disclosure generally relates to reducing the effect of borehole fluid invasion on measurements made by wireline and Logging While Drilling (LWD) logging tools.

BACKGROUND OF THE DISCLOSURE

Many current wireline and LWD logging tools measure formation and/or fluid properties with a relatively shallow depth of-investigation (DOI). Logging data acquired in these shallow DOIs can be significantly affected by the borehole mud filtrate invasion. For example, the sensitive volume of typical Nuclear Magnetic Resonance (NMR) logging instruments ranges from about 1 inch (2.54 cm) to about 4 inches (10.2 cm). NMR sensitive volumes are typically in a flushed zone or invaded zone. As the result, NMR-based fluid typing and saturation estimate may be contaminated by filtrates. For example, the oil-based mud-filtrate (OBMF) is miscible to the native reservoir crude oil. When OBMF invasion occurs, measurements of properties such as hydrocarbon saturation and fluid viscosity made by an NMR tool are affected not only by the native oil but also by OBMF. Nuclear, acoustic, shallow resistivity logging results, as well as fluid sampling measurements, can all be affected by filtrate invasion.

The problem is illustrated in FIG. 2. In FIG. 2 the wellbore 22 is shown with the NMR probe 42 disposed therein. A series of radial positions $RP_1, RP_2, \ldots, RP_n$ are shown as concentrically surrounding the wellbore 22. Each radial position $RP_x$ occupies a portion of the surrounding formation 26, and represents a depth of investigation (DOI). The wellbore 22 traverses a gas zone 60. A portion of the gas zone 60 suffers from invasion, which is depicted as an invasion zone 29. Also as shown in FIG. 2, the sensitive volume 58 includes areas of the gas zone 60, and the invasion zone 29.

Although the sensitive volume 58 is depicted as cylindrical or circular, this is not to be construed as a limitation. The method of the present disclosure is not limited to cylindrical or a portion of the cylindrical shape. For example, the sensitive volume 58 of the MREX™ instrument is not strictly circular. The sensitive volume does not have the same width of the ring (thinner on the sides so it is like a new crescent). In short, the sensitive volume 58 may include a variety of shapes and other geometric properties.

U.S. Pat. No. 7,565,246 to Fang et al., having the same assignee as the present disclosure, teaches a method for determining fluid saturation in a formation at a plurality of radial depths near a wellbore. The method includes: obtaining multi-frequency nuclear magnetic resonance (NMR) response data for the formation; and processing the data to determine simultaneously the fluid saturation at each radial depth. This enables identification of the invaded zone.

The problem of fluid invasion is also present in other shallow measurements. These include formation fluid sampling devices. For example, U.S. Pat. No. 6,871,713 to Meister et al., having the same assignee as the present disclosure and the contents of which are incorporated herein by reference, discloses a formation testing and sampling tool that enables sampling of parameters of formation fluids near a sampling port. Care has to be taken to make sure that the fluid sample is not contaminated with borehole fluid.

An active method of mitigating the effect of fluid invasion is disclosed in U.S. Pat. No. 7,497,256 to DiFoggio et al., having the same assignee as the present application and the contents of which are incorporated herein by reference. DiFoggio teaches the use of a barrier tube that substantially surrounds the probe and is extended into the formation. Another active method is disclosed in U.S. patent application Ser. No. 12/857,091 of Herrick, having the same assignee as the present application and the contents of which are incorporated herein by reference. Herrick teaches the use of a cathode associated with the BHA during drilling operations that is configured to produce a static electric field in the earth formation and inhibit a flow of water from the borehole into the earth formation.

The present disclosure addresses the problem of reducing the invasion of borehole fluids into the formation. Inhibiting the invasion of borehole fluids makes the method of the present disclosure useful not only for NMR measurements but also for other shallow measurements.

SUMMARY OF THE DISCLOSURE

One embodiment of the disclosure is a method of conducting logging operations. The method includes: conveying a formation evaluation (FE) sensor into a borehole in an earth formation; adding a Relative Permeability Modifier (RPM) to a fluid in the borehole for inhibiting an invasion of the fluid in the borehole into the earth formation; and using the FE sensor to measure a property of at least one of: (i) a fluid in the earth formation and (ii) the earth formation.

Another embodiment of the disclosure is an apparatus configured to conduct logging operations. The apparatus includes: a formation evaluation (FE) sensor configured to be conveyed into a borehole in an earth formation; a device configured to add a Relative Permeability Modifier (RPM) to a fluid in the borehole for inhibiting an invasion of the fluid in the borehole into the formation; and wherein the FE sensor is further configured to measure a property of at least one of: (i) a fluid in the formation, and (ii) the formation.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

As noted above, the present disclosure generally relates to inhibiting borehole fluid invasion into the formation on measurement made by tools having a shallow depth of investigation.

Figure 1:
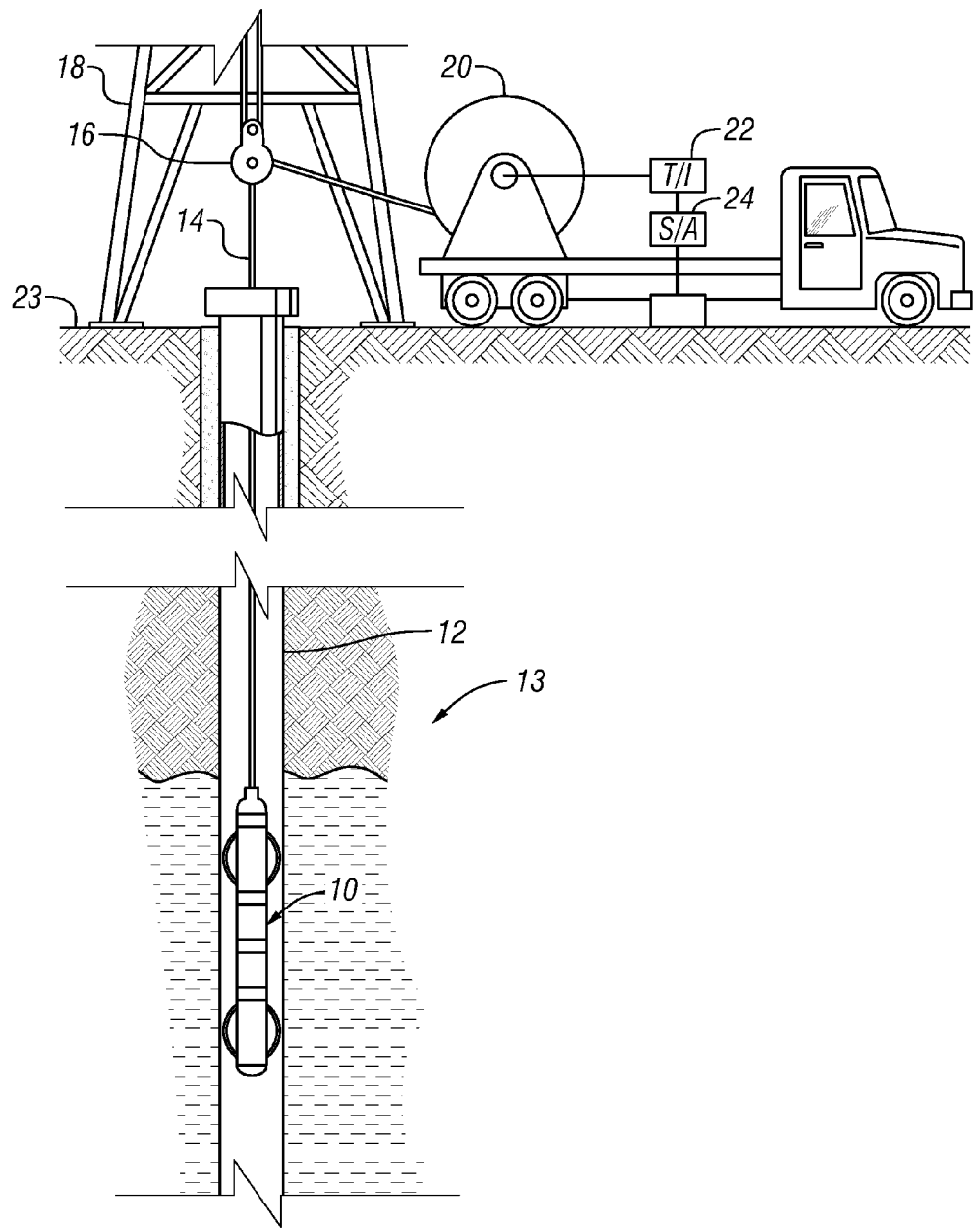
FIG. 1 shows a schematic of a logging tool deployed in a wellbore along a drill string according to one embodiment of the present disclosure.
Figure 2:
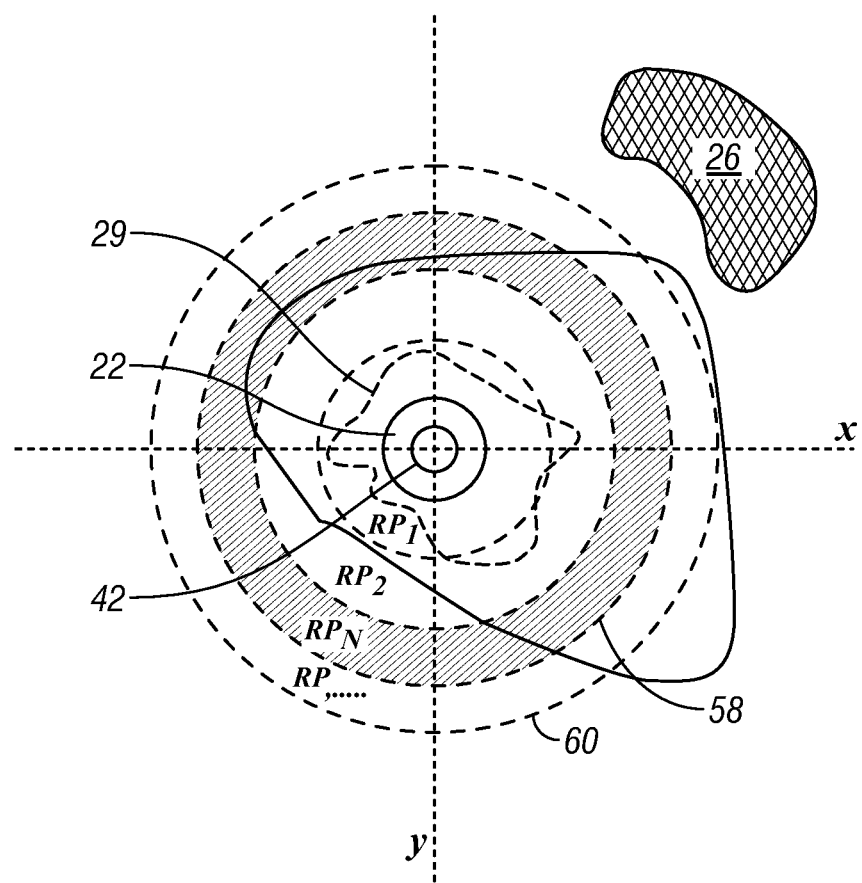
FIG. 2 depicts a radial profile where invasion exists within a gas zone.

FIG. 1 shows an exemplary logging tool 10 suspended in a borehole 12, which penetrates earth formations such as 13, from a carrier 14 that passes over a sheave 16 mounted on drilling rig 18. Carrier 14 may be rigid or non-rigid. Logging tool 10 may be coupled or combined with additional tools. In this example, the tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. While a wireline conveyance system has been shown, it should be understood that embodiments of the present disclosure may be utilized in connection with tools conveyed via rigid carriers (e.g., jointed tubular or coiled tubing) as well as non-rigid carriers (e.g., wireline, slickline, e-line, etc.). The sensors for rigid carriers are typically on a bottomhole assembly (BHA).

Logging tool 10 may be in contact with earth formation 13 when performing various measurement operations. For example, the fluid sampling tools require a probe that contacts the borehole wall. Other tools may not be in contact with the borehole wall. LWD tools are, by definition, run during drilling operations and are less susceptible to the effects of invasion than are wireline tools: there is a lot more time between drilling and logging for the latter: the greater time increases the possibility and extent of fluid invasion. For the purposes of the present disclosure, a fluid sampling tool, and sensor such as an NMR sensor, a nuclear sensor and a resistivity sensor may be referred to as a Formation Evaluation (FE) sensor.

Completely stopping mud filtrate invasion is often difficult if not unachievable. Mud invasion is controlled by rock properties (e.g., porosity, permeability), fluid-rock interface properties (e.g., wettability, capillary pressure), fluid properties (e.g., salinity, compositions, emulsifiers, miscible/immiscible fluids), and environments (e.g., pressure). If one tries to stop invasion by reducing the absolute permeability, it can potentially cause formation damage as the permeability reduction will eventually impair the hydrocarbon production.

On the other hand, a relative permeability modifier favors one fluid type (such as oil, water, or gas) to flow meanwhile make the other fluid types difficult to flow. In literature, such relative permeability modifiers have been experimented in laboratories and reservoir to influence the oil production or reduce the production of water. The key agent of a Relative Permeability Modifier (RPM) can be a polymer, nano-size particles, or other media. The use of an RPM for inhibiting the invasion of borehole fluids into the formation is discussed next.

Relative Permeability Modifier to Reduce the Formate Mud Invasion

Formate muds have seen their increased usage in recent years, particularly because they are environmentally friendly. Formate muds usually contain a mixture of formate brines, like cesium formate, potassium formate, and sodium formate. The percentage of each is formulated to achieve the desired mud weights. Because of the high density of formate brines, they require no solid particles in the mud, such as clay to reach the mud weight requirement. Because of no solids in the formate muds, no mud cake can be built. Without mud cake, the formation is vulnerable to formate fluid invasion.

A drawback of the formate muds is that they can adversely affect the logging data interpretation. In particular, the formate mud invasion affects porosity estimation from density, neutron, and NMR logging measurements. The problems originate from the high density and low hydrogen index of formate brines, which affects bulk density, neutron and NMR reading. Also cesium may affect the measurement of the nuclear cross-section. Even though the density and hydrogen index of formate muds can be determined easily from the chemical formulae, because the formate brines are miscible with water in the formation, the actual density and hydrogen index in the sensitive volume of the logging tool is uncertain. Consequently, there is no good solution to date for correcting the porosity underestimation in formate mud-drilled wells.

In a first embodiment of the disclosure, an RPM selected for low permeability to formate mud but high permeability to hydrocarbons is used to hinder the formate mud invading the formation with a much smaller effect on hydrocarbon permeability. Such an RPM can be a selective wetting agent added to the mud and will react with formation grain minerals to be a formation permeability barrier to formates but not to reservoir fluids. In a second embodiment, the agent is non-reactive to hydrocarbons and reduces permeability to both water and formate brines. This second embodiment has an advantage because water is miscible to formates.

As discussed in U.S. Patent Publication US 20090095484 of Huang et al., having the same assignee as the present application and the contents of which are incorporated herein by reference, The Relative Permeability Modifier may be a hydrophilic polymer. In one non-limiting example, when water flows in, around or through RPM modified permeable media, the hydrophilic polymers coated on the particles expand to reduce the available cross-sectional flow area for the fluid flow channel, which increases resistance to fluid flow (i.e., water). When oil and/or gas flow through this permeable media, the hydrophilic polymers shrink to open the flow channel for oil and/or gas flow.

In another embodiment, the relative permeability modifier consists of nano or sub-micron sized particles whose physical dimension is dependent on particular type of molecules that encounter the nano or submicron sized particles. Addition of such particles selectively reduces permeability when a particular molecule is present in the immediate vicinity of the particles. The effect can be due to particle enlargement, aggregation of particles, adhesion of certain molecules on to the particles, and/or other mechanisms. The increase of the particle size makes it difficult for particles to penetrate the rock's pore system. The prevention of formate invasion to the sensitive volume can significantly improve the accuracy of porosity measurements using neutron, density, or NMR logging instruments.

Relative Permeability Modifier (RPM) to Reduce the Invasion in Water Zone for NMR Based Saturation Analysis Both oil-based mud filtrates (OBMF) and water-based mud filtrates (WBMF) have a hydrogen index substantially close to one. Consequently, NMR log-derived porosity in these types of muds are, in principle, accurate even if filtrate invasion occurs. However, filtrate invasion can affect NMR-based water and hydrocarbon saturation analysis and the determination of water-oil contact (WOC) or water-gas contact (WGC).

For wells drilled with OBM, the invasion of OBMF to a water-bearing formation may cause ambiguity in identifying pay zones and oil-water contacts. Problems may also occur in estimating fluid saturation, particularly when the native oil and OBMF have similar viscosities (and, thus, similar NMR responses). The problem of distinguishing a water-bearing formation from an oil-bearing formation is particularly important. An RPM that should be used in this case is an agent that reduces the permeability for oil invasion in a water-bearing formation. The agent may comprise nano- or submicron particles that can form a suspension in OBMF. In one embodiment, the agent can be a liquid or solid phase additive that reduces the oil permeability in the presence of formation water. There is no requirement for changing oil permeability when such an agent encounters oil in the formation. This scenario is most applicable to diesel-drilled well with no water in borehole. In another embodiment, the agent consists of nano- or submicron particles that form a suspension in OBMF. When the OBMF (with the agent) invades the water zone, the agent expands on contact with pore water and thus hinders the permeability of OBMF. In yet another embodiment, the relative permeability modifier is released only at the front of the drill bit thereby minimizing the possibility of interference of the water in the OBF.

Water-Inhibiting/Solidifying Nanoparticle Additives to Reduce the WBMF Invasion to Oil-Bearing Formations These nanoparticles are packaged in a non-aqueous carrier fluid comprising glycol, polyol, olefin, vegetable or mineral oil, or mixture of these. For avoiding confusion with oil identification at shallow depth of investigation, glycol or polyols may be used, rather than oils, as the non-aqueous carrier fluid. A slurry containing the nanoparticles may be released at the vicinity of the drill bit by a pump connected to a reservoir. The treating slurry, upon contact with water at the borehole wall, solidifies the nanoparticles and forms a barrier to block or retard the WBMF entering porous formation media, thereby retaining a nearly-virgin zone-quality saturations in the shallow DOI region for logging measurements.

As discussed in U.S. Patent Publication 20090286702 of Huang et al., having the same assignee as the present application and the contents of which are incorporated herein by reference, suitable nanoparticles include alkaline earth metal oxides, alkaline earth metal hydroxides, alkali metal oxides, alkali metal hydroxides, transition metal oxides, transition metal hydroxides, post-transition metal oxides, post-transition metal hydroxides, piezoelectric crystals, and/or pyroelectric crystals. The particles may have a mean particle size between about 4 nm to 2000 nm. The lower limit corresponds to nano-sized particles and the upper limit corresponds to sub-micron sized particles. The particles may be added as a slurry to the drilling mud during drilling operations or stored in a container on the bottomhole assembly and pumped to the drill bit when necessary.

Such treatment can be applied to either water-bearing or oil-bearing formations but, for economic reasons, it is unnecessary to apply the treatment to known water-bearing formation depths or other non-producing sections such as shale formation.

While the foregoing disclosure is directed to particular embodiments of the disclosure, various modifications will be apparent to those skilled in the art. It is intended that all variations be embraced by the foregoing disclosure.

What is claimed is:

1. A method of conducting logging operations, the method comprising:
   logging in a borehole penetrating an earth formation using a formation evaluation (FE) sensor, the borehole including a fluid with an added Relative Permeability Modifier (RPM) for inhibiting an invasion of a component of the fluid in the borehole into the earth formation.

2. The method of claim 1 further comprising:
   conveying the FE sensor into the borehole; and
   adding the RPM to the fluid.

3. The method of claim 1 wherein the RPM further comprises at least one of: (i) a polymer, (ii) nano-size particles, and (iii) submicron sized particles.

4. The method of claim 1 wherein the fluid in the borehole further comprises a formate and wherein the FE sensor further comprises a Nuclear Magnetic Resonance (NMR) sensor.

5. The method of claim 1 wherein the fluid in the borehole further comprises a formate and wherein the RPM is selected to be: (i) reactive with formation grain minerals and form a permeability barrier to formates but not to reservoir fluids, or (ii) non-reactive to hydrocarbons and reduces permeability to water and the formate.

6. The method of claim 1 wherein the RPM further comprises a hydrophilic polymer.

7. The method of claim 1 wherein the RPM further comprises at least one of: (i) an alkaline earth metal oxide, (ii) an alkaline earth metal hydroxides, (iii) an alkali metal oxide, (iv) an alkali metal hydroxide, (v) a transition metal oxide, (vi) a transition metal hydroxide, (vii) a post-transition metal oxide, (viii) a post-transition metal hydroxide, (ix) a piezoelectric crystal, and (x) a pyroelectric crystal.

8. The method of claim 1 further comprising conveying the FE sensor into the borehole on one of: (i) a wireline, and (ii) a bottomhole assembly, conveyed on a drilling tubular.

9. The method of claim 1 wherein the FE sensor is selected from the group consisting of: (i) an NMR sensor, (ii) a nuclear sensor, and (iii) a fluid sampling device.

10. An apparatus configured to conduct logging operations, the apparatus comprising:
    a formation evaluation (FE) sensor configured to be conveyed into a borehole in an earth formation;
    a device configured to add a Relative Permeability Modifier (RPM) to a fluid in the borehole for inhibiting an invasion of the fluid in the borehole into the earth formation; and
    wherein the FE sensor is further configured to measure a property of at least one of: (i) a fluid in the earth formation and (ii) the earth formation.

11. The apparatus of claim 10 wherein the RPM further comprises at least one of: (i) a polymer, (ii) nano-sized particles, and (iii) submicron sized particles.

12. The apparatus of claim 10 wherein the fluid in the borehole further comprises a formate and wherein the FE sensor further comprises a Nuclear Magnetic Resonance (NMR) sensor.

13. The apparatus of claim 10 wherein the fluid in the borehole further comprises a formate and wherein the RPM is selected to be at least one of: (i) reactive with formation grain minerals and form a permeability barrier to formates but not to reservoir fluids, or (ii) non-reactive to hydrocarbons and reduces permeability to water and the formate.

14. The apparatus of claim 10 wherein the RPM further comprises a hydrophilic polymer.

15. The apparatus of claim 10 wherein the RPM further comprises at least one of: (i) an alkaline earth metal oxide, (ii) an alkaline earth metal hydroxides, (iii) an alkali metal oxide, (iv) an alkali metal hydroxide, (v) a transition metal oxide, (vi) a transition metal hydroxide, (vii) a post-transition metal oxide, (viii) a post-transition metal hydroxide, (ix) a piezoelectric crystal, and (x) a pyroelectric crystal.

16. The apparatus of claim 10 further comprising conveying the FE sensor into the borehole on one of: (i) a wireline, and (ii) a bottomhole assembly, conveyed on a drilling tubular.

17. The apparatus of claim 10 wherein the FE sensor is selected from the group consisting of: (i) an NMR sensor, (ii) a nuclear sensor, and (iii) a fluid sampling device.

* * * * *